US012441092B2

(12) United States Patent
Antonakis

(10) Patent No.: US 12,441,092 B2
(45) Date of Patent: Oct. 14, 2025

(54) SELF-GROWING DECORATIVE STICKER

(71) Applicant: BIC Violex Single Member S.A., Anoixi (GR)

(72) Inventor: Ion-Ioannis Antonakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 281 days.

(21) Appl. No.: 18/469,248

(22) Filed: Sep. 18, 2023

(65) Prior Publication Data
US 2024/0093062 A1    Mar. 21, 2024

(30) Foreign Application Priority Data
Sep. 21, 2022  (EP) ..................................... 22196843

(51) Int. Cl.
B32B 27/06     (2006.01)
B32B 3/26      (2006.01)
(Continued)

(52) U.S. Cl.
CPC .............. B32B 27/065 (2013.01); B32B 5/20 (2013.01); B44C 1/105 (2013.01); B32B 3/26 (2013.01);
(Continued)

(58) Field of Classification Search
CPC ........... B32B 27/065; B32B 5/20; B32B 3/26; B32B 27/283; B32B 2250/03;
(Continued)

(56) References Cited

U.S. PATENT DOCUMENTS 5,052,418 A    10/1991   Miller
7,131,446 B2   11/2006   Tang et al.
(Continued)

FOREIGN PATENT DOCUMENTS

CN    104418971 A    *   3/2015
CN    110694101 A        1/2020
(Continued)

OTHER PUBLICATIONS

Kwak, Seon-Yeong, Giraldo, Juan Pablo, Lew, Tedrick Thomas Salim, Wong, Min Hao, Liu, Pingwei, Yang, Yun Jung, Koman, Volodymyr B., McGee, Melissa K., Olsen, Bradley D., and Strano, Michael S.. Polymethacrylamide and Carbon Composites that Grow, Strengthen, and Self-Repair using Ambient Carbon Dioxide Fixation. United States: N.p., 2018. Web. doi:10.1002/adma.201804037.
(Continued)

Primary Examiner — John D Freeman
(74) Attorney, Agent, or Firm — Bookoff McAndrews, PLLC

(57) ABSTRACT

In a first aspect, the present disclosure relates to a decorative patch, wherein the decorative patch comprises a first layer and a transparent second layer, wherein the first layer and transparent second layer form a first structure comprising at least one cavity, wherein the at least one cavity comprises an aqueous fluid, and wherein the aqueous fluid comprises a plurality of chloroplasts, a glucose oxidase for converting glucose to gluconolactone, and a monomer or oligomer capable of reacting with gluconolactone.

20 Claims, 3 Drawing Sheets

(51) Int. Cl.
  *B32B 5/20* (2006.01)
  *B44C 1/10* (2006.01)
  *B32B 27/28* (2006.01)
(52) U.S. Cl.
  CPC ......... *B32B 27/283* (2013.01); *B32B 2250/03* (2013.01); *B32B 2264/06* (2013.01); *B32B 2264/108* (2013.01); *B32B 2266/122* (2016.11); *B32B 2307/4026* (2013.01); *B32B 2307/412* (2013.01); *B32B 2307/724* (2013.01); *B32B 2307/7265* (2013.01); *B32B 2405/00* (2013.01); *B32B 2451/00* (2013.01); *B32B 2519/00* (2013.01)
(58) Field of Classification Search
  CPC .......... B32B 2264/06; B32B 2264/108; B32B 2266/122; B32B 2307/4026; B32B 2307/412; B32B 2307/724; B32B 2307/7265; B32B 2405/00; B32B 2451/00; B32B 2519/00; B32B 7/12; B32B 27/30; B32B 27/32; B32B 27/34; B32B 27/36; B44C 1/105; C08F 8/00; C08F 120/60
  See application file for complete search history.

(56) References Cited

U.S. PATENT DOCUMENTS

| | | | |
|---|---|---|---|
| 7,723,405 | B2 | 5/2010 | Braun et al. |
| 8,501,053 | B2 | 8/2013 | Jeganathan et al. |
| 11,155,509 | B2 | 10/2021 | Strano et al. |
| 2012/0288690 | A1 | 11/2012 | Forsythe |
| 2016/0120292 | A1 | 5/2016 | Albate |
| 2016/0235650 | A1 | 8/2016 | Simard |
| 2024/0012165 | A1* | 1/2024 | Ishida ..................... G01T 1/04 |

FOREIGN PATENT DOCUMENTS

| | | |
|---|---|---|
| KR | 20040092678 A | 11/2004 |
| KR | 20070048679 A | 5/2007 |
| KR | 20130016517 A | 2/2013 |

OTHER PUBLICATIONS

Search Report issued in European Application No. 22 19 6843, issued on Feb. 20, 2023.

* cited by examiner

SELF-GROWING DECORATIVE STICKER

CROSS REFERENCE TO RELATED APPLICATION

This application claims priority from the European Patent Application EP 22196843.1, filed on 21 Sep. 2022, the entire contents of which are being incorporated herein by reference.

TECHNICAL FIELD

The present disclosure relates to the field of stickers. More specifically, the present disclosure relates to stickers comprising self-growing components.

BACKGROUND

A sticker, or decorative patch, is usually a printed product made of paper or plastic. Currently, a sticker commonly comprises PVC film as a top layer, upon which an image is printed. The sticker further comprises a paper or film liner as bottom layer. An adhesive is commonly applied to the bottom layer, to allow attaching the sticker to a variety of surfaces.

Stickers are used for a variety of purposes. Stickers may be used as advertising media, product identifications or as official identification media, for example country stickers on number plates.

Another use of stickers is body ornamentation. For example, stickers, in particular peel-away stickers, may be attached to skin as a temporary tattoo. The latest developments of stickers configured to be used as temporary tattoos have been primarily focused on durability of the stickers. For example, peel-away stickers which last longer on the skin or may only be removed by the use of alcohol have been developed. However, manufacturers of stickers are still limited to only static images.

The present disclosure relates to improved stickers comprising novel technical features to allow the provision of innovative designs.

SUMMARY

In a first aspect, the present disclosure relates to a decorative patch, wherein the decorative patch comprises a first layer and a transparent second layer, wherein the first layer and transparent second layer form a first structure comprising at least one cavity, wherein the at least one cavity comprises an aqueous fluid, and wherein the aqueous fluid comprises a plurality of chloroplasts, a glucose oxidase for converting glucose to gluconolactone, and a monomer or oligomer capable of reacting with gluconolactone.

In some embodiments, the first layer and/or transparent second layer may be at least partially permeable to carbon dioxide.

In some embodiments, the monomer or oligomer capable of reacting with gluconolactone may be a primary amine-functionalized amide, in particular a primary amine-functionalized amide monomer or an amine-functionalized amide oligomer.

In some embodiments, the monomer capable of reacting with gluconolactone may comprise aminopropyl methacrylamide.

In some embodiments, the aqueous fluid may comprise a gel.

In some embodiments, the aqueous fluid may be configured to increase in volume when exposed to sunlight and carbon dioxide.

In some embodiments, the aqueous fluid may be configured to expand in volume in response to sunlight and carbon dioxide and the at least one cavity may comprise a first section and a second section, wherein the first section may comprise the aqueous fluid and may be separated from the second section by a barrier material which may be impermeable to the chloroplasts but permeable to the aqueous fluid expanding in response to sunlight and carbon dioxide.

In some embodiments, the first layer and transparent second layer forming the first structure may be arranged parallel to each other and configured to allow expansion of the aqueous fluid parallel to the first layer and the transparent second layer within the at least one cavity and to substantially resist or resist expansion of the aqueous fluid substantially orthogonal or orthogonal to the first layer and transparent second layer.

In some embodiments, the aqueous fluid may comprise pigments or dyes, more specifically dyes which may be covalently attached to monomers, oligomers or polymer contained in the aqueous fluid.

In some embodiments, the first structure may be impermeable to water.

In some embodiments, the aqueous fluid may comprise an antioxidant, in particular cerium oxide nanoparticles.

In some embodiments, the aqueous fluid may comprise graphene oxide, in particular graphene oxide sheets.

In some embodiments, the aqueous fluid may comprise between about 0.001 wt.-% to about 0.1 wt.-%, more specifically between about 0.005 wt.-% to about 0.05 wt.-% of the graphene oxide, compared to the total weight of the aqueous fluid.

In some embodiments, the aqueous fluid may comprise inorganic phosphate.

In some embodiments, the aqueous fluid may comprise an agent for stabilizing glucose oxidase, in particular a phosphate buffer.

In some embodiments, the pH of the aqueous fluid may be between about 5 to about 9, more specifically between 6 to about 8 and in particular between 6.5 to about 7.5.

In some embodiments, the patch may comprise an adhesive, in particular an adhesive configured to attach the decorative patch to human skin.

In some embodiments, the adhesive may be in the form of an adhesive layer.

In some embodiments, the adhesive may comprise a silicone adhesive, polyurethane adhesive, a hydrogel adhesive, a hydrocolloid adhesive, an acrylic adhesive and/or a dry adhesive.

In some embodiments, the decorative element may comprise a top layer, more specifically a transparent top layer and in particular a transparent gas-permeable top layer.

In some embodiments, the decorative element may comprise a detachable layer.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting embodiments. Common reference numerals on different Figures indicate like or similar features.

DETAILED DESCRIPTION

Figure 1A:
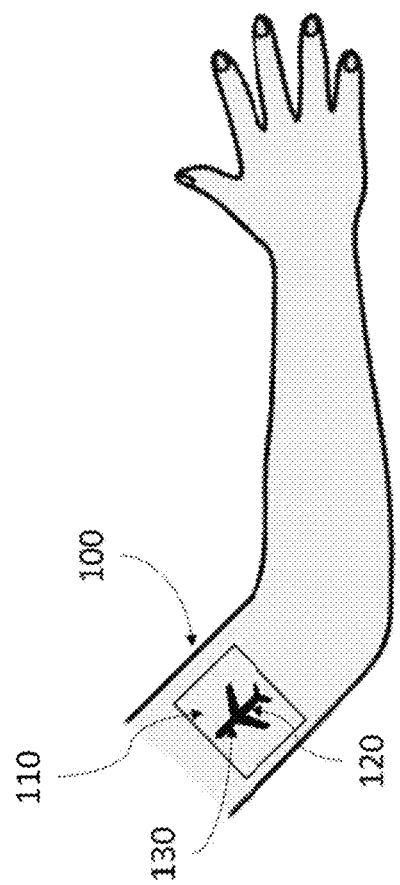
FIG. 1A shows a decorative patch according to the first aspect at a first point in time attached to an arm.

Hereinafter, a detailed description will be given of the present disclosure. The terms or words used in the description and the aspects of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

It is well-known that chloroplasts absorb carbon dioxide and convert it to saccharides, in particular maltose, glucose and triose phosphate. The glucose may be subsequently converted by a glucose oxidase to one gluconolactone and one hydrogen peroxide. In particular, one D-glucose molecule may be oxidized to one D-glucono-1,5-lactone and one hydrogen peroxide. It has been found that the gluconolactone may cross-link monomers or oligomers to grow a gel. The cross-linking of the monomers or oligomers may be further aided by the reactive hydrogen peroxide. It has been surprisingly found that this mechanism may be used to provide decorative patches with dynamic designs.

Accordingly, in a first aspect, the present disclosure relates to a decorative patch 100, wherein the decorative patch 100 comprises a first layer 150 and a transparent second layer 140, wherein the first layer 150 and the transparent second layer 140 form a first structure 110 comprising at least one cavity 120, wherein the at least one cavity 120 comprises an aqueous fluid, and wherein the aqueous fluid comprises a plurality of chloroplasts, a glucose oxidase for converting glucose to gluconolactone, and a monomer or oligomer capable of reacting with gluconolactone.

The term "layer" is well-known in the art and i.a. (inter alia) attributed its common meaning in the art. Additionally or alternatively, the term "layer" may refer to a structure, wherein the structure is greater in a first and second dimension compared to a third dimension, in particular wherein the first and second dimension are at least 3 times greater, more specifically at least 5 times greater and in particular at least 10 times greater than the first dimension. Additionally or alternatively, the term "layer" may refer to a structure wherein the structure has a continuous thickness, in particular wherein the thickness is the third dimension. The term "continuous thickness" may refer to at least 80% of the area defined by the first and second dimension having a variation of thickness in the third dimension of less than 30%, in particular less than 15%, relative to the mean thickness.

The term "transparent" is well-known in the art and i.a. attributed its common meaning in the art. Additionally or alternatively, the term "transparent" may refer to a material property, wherein the material is configured to absorb less than 50%/cm, more specifically less than 40% cm and in particular less than 20%/cm of light with a wavelength between 380 nm to about 750 nm.

The term "aqueous fluid" is well-known in the art and i.a. attributed its common meaning in the art. Additionally or alternatively, the term "aqueous fluid" may refer to a water based fluid, in particular a water based solution. Additionally or alternatively, the term "aqueous fluid" may refer to a fluid, wherein the fluid comprises at least 50 wt.-%, more specifically at least 60 wt.-% and in particular at least 70 wt.-% water.

Figure 1B:
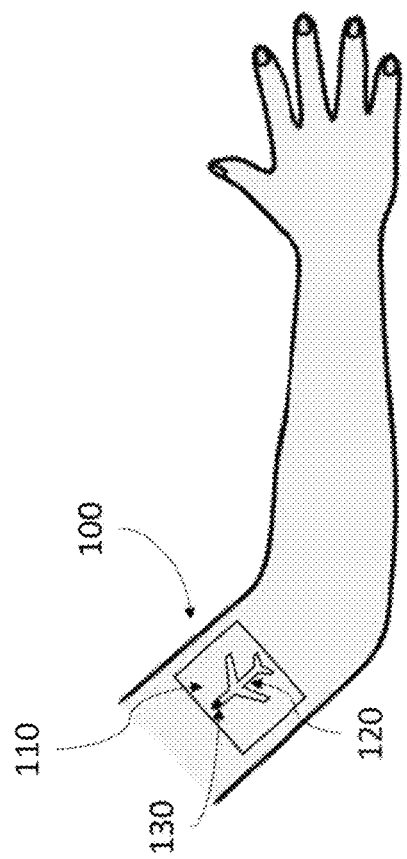
FIG. 1B shows a decorative patch according to the first aspect at a second point in time attached to an arm.

FIGS. 1A and 1B show an embodiment according to the first aspect. In some embodiments, the decorative patch 100 according to the first aspect may be attached to human skin. FIGS. 1A and 1B show the decorative patch 100 attached to the upper arm of a user. The at least one cavity 120 of FIGS. 1A and 1B is in the shape of a plane. FIG. 1A shows the decorative patch 100 at a first point in time. At first, only a starting part 130 may comprise the plurality of chloroplasts. Subsequently, the decorative patch 100, more specifically the chloroplasts, may absorb sunlight and carbon dioxide and form or grow the gel.

FIG. 1B shows the substrate at a second point in time after the first point in time. As shown, the gel has grown to fill the plane, changing the appearance of the decorative patch 100. Alternative designs may include for example a tree, which may grow upwards from the roots.

The gel itself may result in visible change of the decorative patch 100, e.g. the formed gel may exhibit a different color compared to the aqueous fluid. Alternatively or additionally, the chloroplasts comprised within the aqueous fluid may act as a coloring agent. As the gel grows, the chloroplasts may be moved and/or distributed within the at least one cavity 120, changing the visuals of the decorative patch 100. Alternatively or additionally, in some embodiments, the aqueous fluid may comprise pigments or dyes, more specifically dyes which may be covalently attached to monomers, oligomers or polymer contained in the aqueous fluid. The growth or formation of the gel may result in the distribution of the pigments or dyes in the at least one cavity 120. Hence, the pigments or dyes may effectively visualize the growth of the aqueous fluid, in particular the gel, resulting in the aforementioned visual effect.

Figure 2A:
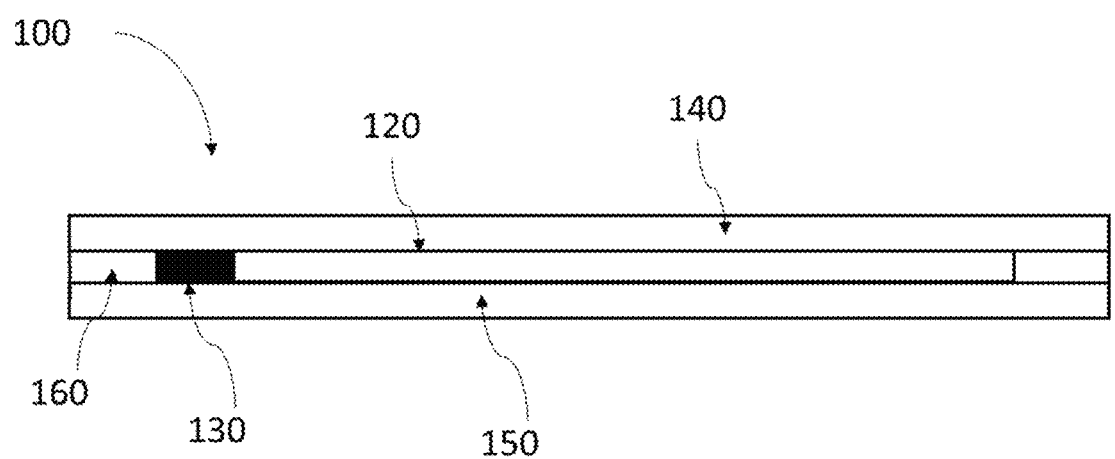
FIG. 2A shows a schematic cross-section of a decorative patch according to the first aspect at a first point in time attached to an arm.
Figure 2B:
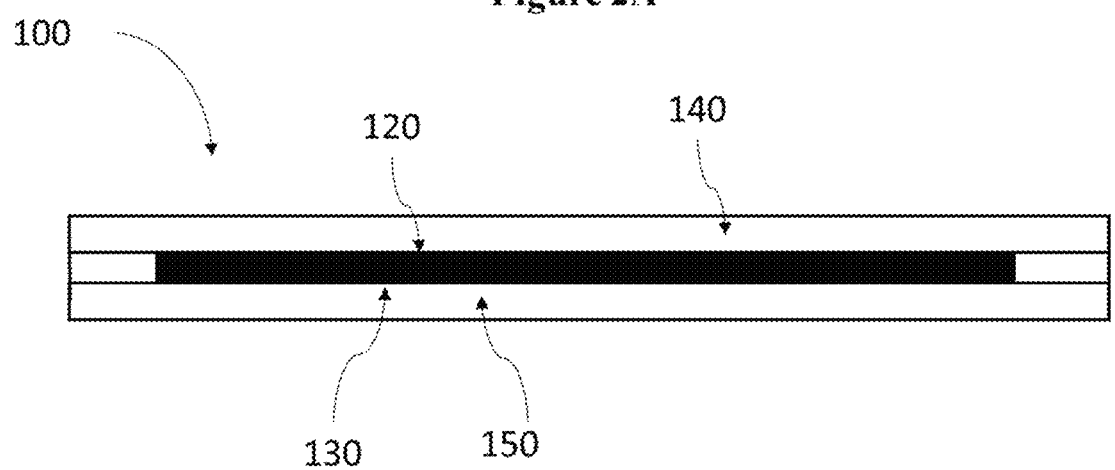
FIG. 2B shows a schematic cross-section of a decorative patch according to the first aspect at a second point in time attached to an arm.

FIG. 2A shows a cross-sectional view of a decorative patch 100 according to the first aspect at the first point in time. The at least one cavity 120 of the decorative patch 100 is disposed between the first layer 150 and the transparent second layer 140. The first layer 150 and transparent second layer 140 shown in FIG. 2A are connected by a connecting segment 160. The connecting segment 160 may also be integrally formed with the first layer 150 or the transparent second layer 140. Alternatively, the connecting segment 160 may also be integrally formed with the first layer 150 and the transparent second layer 140. The first structure 110 may hence be a one-piece part, wherein the one-piece part comprises at least the first layer 150 and the transparent second layer 140 enclosing the at least one cavity 120. As shown in FIG. 2A, at first only the starting part 130 disposed on the left side of the decorative patch 100 is colored, e.g. only the starting part 130 may comprise the gel, dye and/or pigments. As the gel grows, the colored area expands throughout the at least one cavity 120. FIG. 2B shows the at least one cavity 120 filled with the gel and completely colored.

The decorative patch 100 may comprise a plurality of cavities. The plurality of cavities may comprise different gels, dyes or pigments, resulting in different colors.

In some embodiments, the first layer 150 and/or the transparent second layer 140 may be at least partially permeable to carbon dioxide. As a result, the carbon dioxide may diffuse into the at least one cavity 120, wherein it can be absorbed by the plurality of chloroplasts to synthesize glucose. Alternatively or additionally, the aqueous fluid may be enriched with carbon dioxide and/or hydrogen carbonates so as to act as a carbon source for the plurality of chloroplasts. In some embodiments, the first layer 150 and/or the transparent second layer 140 may comprise polydimethylsiloxane (PDMS), which may be permeable to carbon dioxide. Further, PDMS may be transparent.

Additionally, using PDMS in soft lithography allows the efficient production of microstructures, e.g. microfluidic channels. Therefore, PDMS, in particular in conjunction with soft lithography, may be efficiently used to provide the at least one cavity 120. However, other polymers permeable to carbon dioxide may also be used, for instance certain grades of low density polyethylene (LDPE).

Alternatively, the first layer 150 may comprise polyethylene terephthalate, polyethylene, polyethylene terephthalate glycol, low-density polyethylene, nylon, polyester, polyamide, and/or acrylic polymers.

In some embodiments, the monomer or oligomer capable of reacting with gluconolactone may be a primary amine-functionalized amide, in particular a primary amine-functionalized amide monomer or an amine-functionalized amide oligomer. More specifically, the monomer capable of reacting with gluconolactone may comprise aminopropyl methacrylamide.

In some embodiments, an oligomer capable of reacting with gluconolactone may be present. The term "oligomer" is understood in the art to refer to short-chained polymers having up to 8 repeat units, but, for the purposes of the present disclosure, is also intended to encompass longer-chained polymers, i.e. polymers as the term is understood in the art.

In some embodiments, the aqueous fluid may comprise a gel and/or be in the form of a gel. The gel may stabilize the chloroplasts, in some embodiments preventing clumping thereof. Additionally, the gel may keep the first section in place during transport and storage of the patch, until the patch is exposed to sunlight. In some embodiments, the gel may be a hydrogel.

The term "gel" is well-known and i.a. attributed its common meaning in the art. Additionally or alternatively, the term "gel" may refer to a viscoelastic fluid. Additionally or alternatively, the term "gel" may refer to a disperse system comprising at least two components, wherein a first component forms a three-dimensional network, and the second component is a fluid, in particular water, disposed within the three-dimensional network.

Figure 3A:
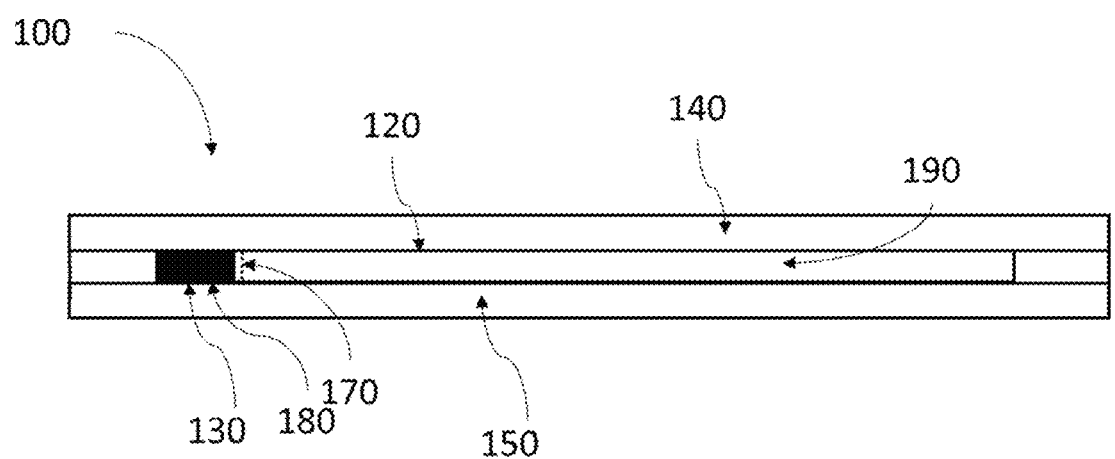
FIG. 3A shows a schematic cross-section of an alternative decorative patch according to the first aspect at a first point in time attached to an arm.
Figure 3B:
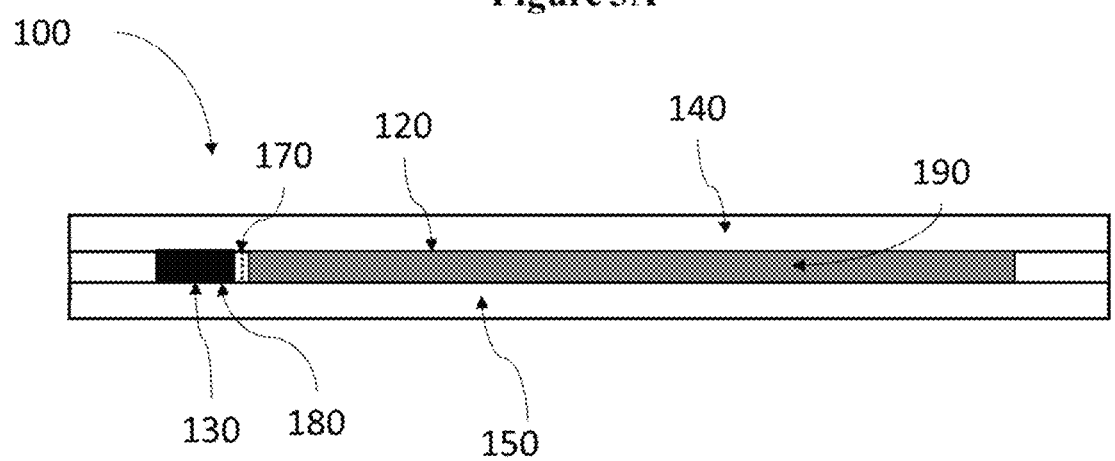
FIG. 3B shows a schematic cross-section of an alternative decorative patch according to the first aspect at a second point in time attached to an arm.

As mentioned above, the aqueous fluid may be configured to increase in volume when exposed to sunlight and carbon dioxide. As shown in FIG. 3A, the at least one cavity 120 may comprise a first section 180 and a second section 190, wherein the first section 180 may comprise the aqueous fluid and may be separated from the second section 190 by a barrier material 170 which may be impermeable to the chloroplasts but permeable to the aqueous fluid expanding in response to sunlight and carbon dioxide. In some embodiments, the barrier material 170 may be a porous structure exhibiting a pore size of less than 1 μm. FIG. 3A again shows the decorative patch 100 at a first point in time, wherein the first section 180 is colored, whereas the second section 190 is transparent. FIG. 3B shows the decorative patch 100 at a second point in time after the first point in time, wherein the second section 190 is colored. The second section 190 is depicted in a different shade, as it does not comprise the chloroplasts. However, the second section 190 may exhibit the same color if the coloration effect relies on the gel, dye and/or pigment.

In some embodiments, and as depicted in FIG. 2A, 2B, 3A, 3B, the first layer 150 and the transparent second layer 140 forming the first structure 110 may be arranged parallel to each other and configured to allow expansion of the aqueous fluid parallel to the first layer 150 and the transparent second layer 140 within the at least one cavity 120 and to substantially resist or resist expansion of the aqueous fluid substantially orthogonal or orthogonal to the first layer 150 and the transparent second layer 140.

In some embodiments, the first structure 110 may be impermeable to water. Hence, the first structure 110 may efficiently retain the water within the at least one cavity 120, preventing leakage and/or evaporation of the water.

In some embodiments, the first structure 110 may comprise a plurality of cavities, in particular wherein at least two cavities of the plurality of cavities comprise a different dye and/or pigment. In some embodiments, the first structure 110 may be configured to show a bouquet of flower. The first structure 110 may comprise a first cavity comprising a green dye or colorant, which extends longitudinal to form the flower's stem and a second cavity comprising a yellow dye or pigment forming the flower's blossom.

In some embodiments, the aqueous fluid may comprise an antioxidant, in particular cerium oxide nanoparticles. The antioxidant may scavenge reactive oxygen species, which may be formed as a by-product of the synthesis performed by the chloroplasts. The reactive oxygen species may damage the chloroplasts. As a result, the antioxidant, in particular the cerium oxide nanoparticles, may increase the working life of the plurality of chloroplasts.

In some embodiments, the aqueous fluid may comprise graphene oxide, in particular graphene oxide sheets. The glucose oxidase may be immobilized on the graphene oxide, in particular graphene oxide sheets. The graphene oxide sheets may significantly increase the reaction rate of the glucose oxidase converting glucose to gluconolactone.

In some embodiments, the aqueous fluid may comprise between about 0.001 wt.-% to about 0.1 wt.-%, more specifically between about 0.005 wt.-% to about 0.05 wt.-% of the graphene oxide, compared to the total weight of the aqueous fluid.

In some embodiments, the aqueous fluid may comprise inorganic phosphate. The inorganic phosphate may increase the lifetime and/or productivity of the chloroplasts. In some embodiments, the aqueous fluid may comprise an agent for stabilizing glucose oxidase, in particular a phosphate buffer. The agent for stabilizing the glucose oxidase may be the same as the inorganic phosphate.

In some embodiments, the pH of the aqueous fluid may be between about 5 to about 9, more specifically between 6 to about 8 and in particular between 6.5 to about 7.5. The aforementioned pH ranges may improve the productivity of the plurality chloroplasts and/or of the glucose oxidase.

In some embodiments, the decorative patch 100 may comprise an adhesive, in particular an adhesive configured to attach the decorative patch 100 to human skin. In some embodiments, the adhesive may be in the form of an adhesive layer. The adhesive may be safe for human use. In some embodiments, the adhesive may be configured to be a removable adhesive. The adhesive may comprise for example a silicone adhesive, polyurethane adhesive, a hydrogel adhesive, a hydrocolloid adhesive, an acrylic adhesive and/or a dry adhesive. The adhesive, in particular the adhesive layer, may be, in some embodiments, in direct contact with first structure 110, in particular in direct contact with the first layer 150.

The term "adhesive" within this disclosure may refer to a structure configured to adhere to a surface of another structure. Additionally or alternatively, the term "adhesive" may refer to a curable fluid configured to bond a first and a second surface when cured. In some embodiments, a gel comprising polyvinylalcohol and borax may form a structure able to adhere to surfaces without additionally curing. On the other hand, liquid polyvinylalcohol may be used as a curable adhesive.

In some embodiments, the decorative patch 100 may comprise a top layer, more specifically a transparent top layer and in particular a transparent gas-permeable top layer. The transparent top layer may, in some embodiments, protect the underlying first structure 110 from damage, e.g. by foreign objects. In some embodiments, such top layer may be in contact with the transparent second layer 140. The transparent gas-permeable top layer may also comprise PDMS and/or LDPE, in particular PDMS and/or LDPE of increased hardness compared to the second layer 140.

In some embodiments, the decorative patch 100 may comprise a detachable layer. In some embodiments, the adhesive layer may be attached to the detachable layer. The detachable layer may comprise cellulose paper or a polymer, e.g. polypropylene and/or polyester. The detachable layer may protect the adhesive from curing or from accumulating dirt, which may reduce the adhesive's adhesive properties. The detachable layer may then be peeled away before use. The decorative patch 100 comprising the detachable layer may allow the provision of a peel-away sticker. However, a detachable layer is not mandatory. In other embodiments, or additional to the detachable layer, the adhesive may be water activated. As a result, the adhesive may only exhibit its adhesive properties after contact with water.

In some embodiments, the decorative patch 100 may comprise a second structure. In some embodiments, the second structure may be a support structure, wherein the support structure is configured to improve the decorative patch's 100 mechanical properties, e.g. increase its rigidity. Alternatively or additionally, the second structure may provide a background for the decorative patch 100, e.g. the background may provide an increased contrast for the at least one cavity 120 and the gel formed therein. In some embodiments, the second structure may be a polymer or paper. In some embodiments, the second structure may be attached to the first structure, in particular the first layer 150. The second structure may be disposed between the first layer 150 and the adhesive layer.

Although the present disclosure is defined in the attached claims, it should be understood that the present disclosure can also (alternatively) be defined in accordance with the following aspects:

1. A decorative patch (100), wherein the decorative patch (100) comprises a first layer (150) and a transparent second layer (140), wherein the first layer (150) and the transparent second layer (140) form a first structure (110) comprising at least one cavity (120), wherein the at least one cavity (120) comprises an aqueous fluid, and
wherein the aqueous fluid comprises a plurality of chloroplasts, a glucose oxidase for converting glucose to gluconolactone, and a monomer or oligomer capable of reacting with gluconolactone.
2. The decorative patch (100) according to embodiment 1, wherein the first layer (150) and/or the transparent second layer (140) are at least partially permeable to carbon dioxide.
3. The decorative patch (100) according to any preceding embodiment, wherein the monomer or oligomer capable of reacting with gluconolactone is a primary amine-functionalized amide, in particular a primary amine-functionalized amide monomer or an amine-functionalized amide oligomer.
4. The decorative patch (100) according to any preceding embodiment, wherein the monomer capable of reacting with gluconolactone comprises aminopropyl methacrylamide.
5. The decorative patch (100) according to any preceding embodiment, wherein the aqueous fluid comprises a gel.
6. The decorative patch (100) according to any preceding embodiment, wherein the aqueous fluid is configured to increase in volume when exposed to sunlight and carbon dioxide.
7. The decorative patch (100) according to any preceding embodiment, wherein the aqueous fluid is configured to expand in volume in response to sunlight and carbon dioxide and wherein the at least one cavity (120) comprises a first section (180) and a second section (190), wherein the first section (180) comprises the aqueous fluid and is separated from the second section (190) by a barrier material (170) which is impermeable to the chloroplasts but permeable to the aqueous fluid expanding in response to sunlight and carbon dioxide.
8. The decorative patch (100) according to any preceding embodiment, wherein the first layer (150) and the transparent second layer (140) forming the first structure (110) are arranged parallel to each other and configured to allow expansion of the aqueous fluid parallel to the first layer (150) and the transparent second layer (140) within the at least one cavity (120) and to substantially resist or resist expansion of the aqueous fluid substantially orthogonal or orthogonal to the first layer (150) and the transparent second layer (140).
9. The decorative patch (100) according to any preceding embodiment, wherein the aqueous fluid comprises pigments or dyes, more specifically dyes which are covalently attached to monomers, oligomers or polymer contained in the aqueous fluid.
10. The decorative patch (100) according to any preceding embodiment, wherein the first structure (110) is impermeable to water.
11. The decorative patch (100) according to any preceding embodiment, wherein the aqueous fluid comprises an antioxidant, in particular cerium oxide nanoparticles.
12. The decorative patch (100) according to any preceding embodiment, wherein the aqueous fluid comprises graphene oxide, in particular graphene oxide sheets.
13. The decorative patch (100) according to embodiment 12, wherein the aqueous fluid comprises between about 0.001 wt.-% to about 0.1 wt.-%, more specifically between about 0.005 wt.-% to about 0.05 wt.-% of the graphene oxide, compared to the total weight of the aqueous fluid.

14. The decorative patch (100) according to any preceding embodiment, wherein the aqueous fluid comprises inorganic phosphate.

15. The decorative patch (100) according to any preceding embodiment, wherein the aqueous fluid comprises an agent for stabilizing glucose oxidase, in particular a phosphate buffer.

16. The decorative patch (100) according to any preceding embodiment, wherein the pH of the aqueous fluid is between about 5 to about 9, more specifically between 6 to about 8 and in particular between 6.5 to about 7.5.

17. The decorative patch (100) according to any preceding embodiment, wherein the patch comprises an adhesive, in particular an adhesive configured to attach the decorative patch (100) to human skin.

18. The decorative patch (100) according to embodiment 17, wherein the adhesive is in the form of an adhesive layer.

19. The decorative patch (100) according to embodiment 17 or 18, wherein the adhesive comprises a silicone adhesive, polyurethane adhesive, a hydrogel adhesive, a hydrocolloid adhesive, an acrylic adhesive and/or a dry adhesive.

20. The decorative patch (100) according to any preceding embodiment, wherein the decorative element comprises a top layer, more specifically a transparent top layer and in particular a transparent gas-permeable top layer.

21. The decorative patch (100) according to any preceding embodiment, wherein the decorative element comprises a detachable layer.

The invention claimed is:

1. A decorative patch, wherein the decorative patch comprises a first layer and a transparent second layer, wherein the first layer and the transparent second layer form a first structure comprising at least one cavity, wherein the at least one cavity comprises an aqueous fluid, and
wherein the aqueous fluid comprises a plurality of chloroplasts, a glucose oxidase for converting glucose to gluconolactone, and a monomer or oligomer capable of reacting with gluconolactone.

2. The decorative patch according to claim 1, wherein the first layer and/or the transparent second layer are at least partially permeable to carbon dioxide.

3. The decorative patch according to claim 1, wherein the monomer or oligomer capable of reacting with gluconolactone is a primary amine-functionalized amide.

4. The decorative patch according to claim 1, wherein the monomer or oligomer capable of reacting with gluconolactone is a primary amine-functionalized amide monomer or an amine-functionalized amide oligomer.

5. The decorative patch according to claim 1, wherein the monomer capable of reacting with gluconolactone comprises aminopropyl methacrylamide.

6. The decorative patch according to claim 1, wherein the aqueous fluid comprises a gel.

7. The decorative patch according to claim 1, wherein the aqueous fluid is configured to increase in volume when exposed to sunlight and carbon dioxide.

8. The decorative patch according to claim 1, wherein the aqueous fluid is configured to expand in volume in response to sunlight and carbon dioxide and wherein the at least one cavity comprises a first section and a second section, wherein the first section comprises the aqueous fluid and is separated from the second section by a barrier material which is impermeable to the chloroplasts but permeable to the aqueous fluid expanding in response to sunlight and carbon dioxide.

9. The decorative patch according to claim 1, wherein the first layer and the transparent second layer forming the first structure are arranged parallel to each other and configured to allow expansion of the aqueous fluid parallel to the first layer and the transparent second layer within the at least one cavity and to substantially resist or resist expansion of the aqueous fluid substantially orthogonal or orthogonal to the first layer and the transparent second layer.

10. The decorative patch according to claim 1, wherein the aqueous fluid comprises pigments or dyes.

11. The decorative patch according to claim 1, wherein the aqueous fluid comprises dyes which are covalently attached to monomers, oligomers or polymer contained in the aqueous fluid.

12. The decorative patch according to claim 1, wherein the first structure is impermeable to water.

13. The decorative patch according to claim 1, wherein the aqueous fluid comprises graphene oxide.

14. The decorative patch according to claim 1, wherein the aqueous fluid comprises graphene oxide sheets.

15. The decorative patch according to claim 1, wherein the aqueous fluid comprises between about 0.001 wt.-% to about 0.1 wt.-% of graphene oxide, compared to the total weight of the aqueous fluid.

16. The decorative patch according to claim 1, wherein the aqueous fluid comprises inorganic phosphate.

17. The decorative patch according to claim 1, wherein the aqueous fluid comprises an agent for stabilizing glucose oxidase.

18. The decorative patch according to claim 1, wherein the pH of the aqueous fluid is between about 5 to about 9.

19. The decorative patch according to claim 1, wherein the patch comprises an adhesive.

20. The decorative patch according to claim 14, wherein the adhesive is in the form of an adhesive layer.

* * * * *